United States Patent
Matos Ricardo et al.

(10) Patent No.: US 9,283,831 B2
(45) Date of Patent: Mar. 15, 2016

(54) CABRIOLET VEHICLE FOR PASSENGER TRANSPORT

(71) Applicant: Augustinus Maria Verachtert, Arnhem (NL)

(72) Inventors: Carlos Alberto Matos Ricardo, Maia (PT); Geertruida Anna Petronella Maria Lammers, Maia (PT)

(73) Assignee: Augustinus Maria Verachtert, Arnhem (NL)

( * ) Notice: Subject to any disclaimer, the term of this patent is extended or adjusted under 35 U.S.C. 154(b) by 0 days.

(21) Appl. No.: 14/371,771

(22) PCT Filed: Jan. 14, 2013

(86) PCT No.: PCT/NL2013/050018
§ 371 (c)(1),
(2) Date: Jul. 11, 2014

(87) PCT Pub. No.: WO2013/105860
PCT Pub. Date: Jul. 18, 2013

(65) Prior Publication Data
US 2015/0015022 A1 Jan. 15, 2015

Related U.S. Application Data

(63) Continuation of application No. PCT/NL2012/050654, filed on Sep. 17, 2012.

(30) Foreign Application Priority Data

Jan. 13, 2012 (NL) .................................. 2008118

(51) Int. Cl.
| | | |
|---|---|---|
| *B62D 31/02* | (2006.01) | |
| *B60J 7/02* | (2006.01) | |
| *B60J 10/00* | (2006.01) | |
| *B60J 10/12* | (2006.01) | |

(Continued)

(52) U.S. Cl.
CPC ............... *B60J 7/026* (2013.01); *B60J 7/0092* (2013.01); *B60J 10/0037* (2013.01); *B60J 10/12* (2013.01); *B62D 31/02* (2013.01); *B62D 47/00* (2013.01)

(58) Field of Classification Search
CPC ......... B60J 7/047; B62D 31/00; B62D 31/02; B62D 31/025; B62D 31/04; B62D 47/02
USPC ........ 296/178, 220.01, 193.12, 107.19, 107.2
See application file for complete search history.

(56) References Cited

U.S. PATENT DOCUMENTS

| 1,831,907 | A | 11/1931 | Hart |
| 6,851,741 | B1 | 2/2005 | Burg |

(Continued)

FOREIGN PATENT DOCUMENTS

| DE | 4212262 A1 | 10/1993 |
| DE | 10139983 A1 | 10/2002 |

(Continued)

OTHER PUBLICATIONS

International Search Report for PCT/NL 2013/050018 dated Apr. 10, 2013.

*Primary Examiner* — Dennis H Pedder
(74) *Attorney, Agent, or Firm* — Shumaker, Loop & Kendrick, LLP

(57) ABSTRACT

The present invention relates to a hardtop passenger vehicle with a driver's seat and passenger seats. The passenger vehicle includes a chassis and body with a passenger compartment including a substantially U-shaped roof construction, which covers at least some of the seats of the vehicle in which portions of the roof construction can be removed. The substantially U-shaped roof construction includes at least two shape retaining, nestable roof elements that are movable relative to each other and are positioned at least one behind another, at least when in a covering position.

13 Claims, 2 Drawing Sheets

(51) Int. Cl.
  *B60J 7/00* (2006.01)
  *B62D 47/00* (2006.01)

(56) References Cited

U.S. PATENT DOCUMENTS

| | | |
|---|---|---|
| 2007/0164592 A1 | 7/2007 | Gerhardt |
| 2009/0174246 A1 | 7/2009 | Kaip et al. |
| 2011/0316302 A1 | 12/2011 | Lenz, Jr. |

FOREIGN PATENT DOCUMENTS

| | | |
|---|---|---|
| EP | 2272700 A1 | 1/2011 |
| FR | 1530465 A | 6/1968 |
| GB | 349172 A | 5/1931 |
| GB | 360160 A | 11/1931 |

CABRIOLET VEHICLE FOR PASSENGER TRANSPORT

CROSS-REFERENCE TO RELATED APPLICATION

This U.S. National Stage Application claims priority from PCT/NL2013/050018 filed Jan. 14, 2013, which claims priority from NL 2008118 filed on Jan. 13, 2012 and from PCT/NL2012/050654 filed on Sep. 17, 2012, the entirety of which are incorporated herein by reference.

TECHNICAL FIELD AND BACKGROUND OF THE INVENTION

The present invention relates to a bus of the hardtop type having at least ten seats and comprising a chassis and a body with an at least substantially U-shaped roof construction, which covers at least some of the seats of the bus, which roof construction can be removed, and be replaced again, over at least some of the at least ten seats. Unless explicitly stated otherwise, the term "remove" as used herein is understood to mean removing the cover from its original, seat-covering position. Furthermore preferably, the bus has at least thirteen seats, so that the bus will be suitable for group transport or for touristic purposes.

Such a vehicle is known as a cabrio bus. The known cabrio bus has a substantially U-shaped roof construction, which is detachably attached to the bus body. Upon conversion of the known cabrio bus from a closed bus to an open bus, the roof construction is detached and the roof construction, or at least the removable part thereof, is removed from the body and temporarily stored outside the bus. The cabrio bus can now be used with an open roof. When the roof of the cabrio bus is to be closed, the bus is driven to the location where the removable part of the roof construction is temporarily stored. At that location, the roof construction is placed on the body again and attached thereto.

A drawback of the known cabrio bus is the fact that the conversion from a closed roof state to and open roof state, and vice versa, is a relatively laborious job. In addition, the removable part of the roof construction is separated from the bus, so that the roof construction is not available for being placed back in the case of a sudden change of the weather.

Accordingly it is the object of the present invention to provide a passenger vehicle as described in the introduction which is easier to convert between a closed roof state and an open roof state and/or which remains with the vehicle also in the open position of the roof.

This object is achieved by the present invention in that the substantially U-shaped roof construction comprises at least two substantially shape retaining, nestable roof elements which are movable relative to each other and which are positioned at least substantially one behind another, at least in the covering position. This makes it possible to store the nestable roof elements in a nested position in or on the vehicle in the non-covering position, as a result of which one or more roof elements can be removed from their original position by being moved in the vehicle from an original position, in which they cover one or more seats in the passenger compartment of the vehicle, to a nested position. This is realised without the storage thereof objectionably taking up any space, or at least hardly any space, for any passengers in the passenger compartment. An example of this is described in PCT/NL/2012/0505654. Thus, the roof elements that have been removed from their covering position can be carried along by the vehicle at all times, also in their removed position, so that the object of the present invention is (at least partially) achieved. The term "non-covering position" of a roof element is understood to mean the position of the roof element in which the roof element does not cover that part of the passenger compartment above the seats where it is located in the covering position. Nested roof elements may jointly cover another part of the passenger compartment, or at least of the vehicle, however.

Passenger vehicles of the hardtop convertible type in which the roof elements can be stored in a compact manner in relation to each other in the vehicle in the open position of the roof do exist, to be true, but insofar as the relative position of the roof elements in that state may be regarded as nested, there is this important difference that vehicles comprising fewer seats, as a rule no more than four, are concerned in that case. The removable part of the roof construction is relatively small in order to be able to store the shape-retaining elements of the roof in the vehicle, for example in the trunk of a car.

A known convertible comprises a hinged frame provided with a flexible fabric, wherein the fabric, which functions as a roof, can be folded open by swinging hinging elements of the hinged frame rearwards, seen in the driving direction of the vehicle. The fabric folds onto itself, so that it will take up relatively little space in the open position of the roof. This is not a hardtop convertible type, however. A drawback of such a roof is the fact that the construction is not shape-retaining and that weather influences are relatively easily noticeable by the occupants also in the closed position of the roof construction. In addition, the windows of the removable part of the roof construction are less suitable for looking out therethrough in the closed position of vehicle. They are made of a flexible plastic material.

U.S. Pat. No. 6,851,741 describes a combined passenger and cargo vehicle with an extendable cargo area. The cargo area can be extended by the use of collapsible seats behind the driver's seat. The part where the (collapsible) seats are located is permanently covered in its entirety by a fixed roof construction. Provided above a permanent cargo part are movable roof elements for the cargo bed, so that the covering of the cargo space can be partially cleared.

U.S. Pat. No. 6,997,502 describes a pickup truck having a cargo part with a hard cover, roof elements of which can be moved to an overlapping position. A passenger part is separated from the cargo part by means of a fixed cover and a partition.

The passenger compartment preferably extends from the B-pillar to the C-pillar of the passenger vehicle. Thus, a passenger compartment that extends over the entire length behind the driver's seat is provided.

It is furthermore preferable if the passenger compartment extends from the A-Pillar to the C-pillar of the passenger vehicle. Thus, the passenger compartment extends over substantially the entire vehicle, so that the space of the vehicle can be maximally used for the driver and passengers. Put differently, this makes it possible to cover a large number of the seats present in the vehicle with removable roof elements.

If the length of the passenger compartment is at least three meters, the part of the passenger compartment covered by the removable roof elements is sufficiently large for using the vehicle as a tour vehicle for tourists. A removable cover provides tourists with a better view of the surroundings outside the vehicle.

To realise an efficient utilisation of the passenger vehicle and driver, it is preferable if the number of seats is at least six. Thus, at least six persons can be taken around by means of the vehicle.

On the other hand it is preferable if the number of seats is at most nine. In accordance with (at least European) legislation, a driver having a license for driving passenger cars, called a B-license in the Netherlands, is allowed to drive a vehicle with at most nine seats. Thus, any person who has such a driving license is in principle allowed to drive the vehicle according to the present preferred embodiment without being required to have additional certificates or diplomas.

SUMMARY OF THE INVENTION

In a preferred embodiment of the present invention, the driver's seat and at least two rows of passenger seats disposed behind the driver's seat are provided in the passenger compartment. The rows may extend parallel to and/or perpendicular to a longitudinal axis of the vehicle and comprise individual seats or seat assemblies.

A flexible arrangement of the passenger compartment can be realised if one or more of the passenger seats is/are rotatable through at least about 90 degrees, preferably 180 degrees, about a substantially vertical axis of rotation. Alternatively, the seats in the form of individual seats or seat assemblies may be detached from the vehicle to be reattached to the vehicle at a revised angle.

Preferably, the passenger vehicle is a vehicle of the minibus type.

To provide a good view from the bus through a roof element, or through a number of roof elements stored in a nested position, it is preferable if the roof element is at least substantially transparent.

In a preferred embodiment of the present invention, at least one of the nestable roof elements is immovably connected to the body. The other roof elements can be nested relative to said at least one immovable roof element. It is preferable in that regard if the immovable roof element is larger than the movable roof elements, with the movable roof elements being accommodable within said immovable roof element. The largest (immovable) roof element forms an adequate protection against the influence of the weather on the movable roof elements, in particular while the vehicle is driving.

A movable roof element is preferably movable along a guide element. This makes it possible to move a movable roof element to the desired position in a relatively simple and guided manner along a guide. Although a guide is an excellent aid during said movement, the provision of a guide is not necessary, however. The movable roof elements might be simply detached from the vehicle, for example, to be subsequently moved to a desired position in or on the vehicle, for example be carried by persons.

In a preferred embodiment of the present invention, the body comprises at least one guide element, along which the movable roof element is guided upon being moved. The guide element on the body can cooperate with a guide element on a movable roof element, so that the movable roof element can be guided between a closed position and an open position of the roof in a simple manner through cooperation of the guides.

Alternatively, or additionally, the at least one guide element is provided on a further roof element, relative to which further roof element the movable roof element is nestable. In such a situation, a guide element on the movable roof element can cooperate with the at least one guide element on the further roof element, for example in the way a drawer cooperates with a cabinet in which the draw is slidably accommodated.

The guide element preferably comprises one or more rails extending in the longitudinal direction of the vehicle so as to make it possible to move a movable roof element in the longitudinal direction of the vehicle from the open position to the closed position of the roof.

In a preferred embodiment of the present invention, the passenger vehicle comprises two or more movable roof elements, each provided with an associated guide element. If the number of movable roof elements of the passenger vehicle is larger, a relatively larger part of the roof construction can be removed, at least if the roof elements are about the same length. When two roof elements are used, one being movable, approximately half the roof construction can be removed by nesting one movable roof element in the immovable roof element (or conversely). If three movable roof elements can be nested in an immovable roof element, approximately three quarters of the roof construction can be removed. Furthermore, relatively small roof elements are relatively easy to move. On the other hand, each next nestable, movable roof element needs to be smaller than the preceding one, and consequently a situation in which the space within the passenger vehicle, i.e. the space covered by the smallest roof element, is limited by the presence of a (too) large number of roof elements must be prevented.

In a preferred embodiment of the present invention, a roof element comprises a roof part and two window parts, i.e. the base of the inverted U-shape of the roof construction comprises the roof part and the legs of the inverted U-shape comprise the window parts. Thus, the space above and beside the passenger spaces covered by the movable roof element in the closed position thereof can be cleared in one go by moving a movable roof element. Alternatively, the roof part of the roof element is movable in the longitudinal direction of the passenger vehicle in a manner as described above, and window parts of the roof element are separate from the roof part so that they can be accommodated in the body in vertical direction, for example in a known manner similar to car windows of passenger cars. The presence of vertical guides for the windows above the body must preferably be prevented, not only because said vertical guides are vulnerable in the lowered position of the window parts, but also because passenger safety may be affected by their presence.

BRIEF DESCRIPTION OF THE DRAWINGS

The present invention will now be explained with reference to the appended drawings, in which.

DETAILED DESCRIPTION OF THE INVENTION

Figure 1A:
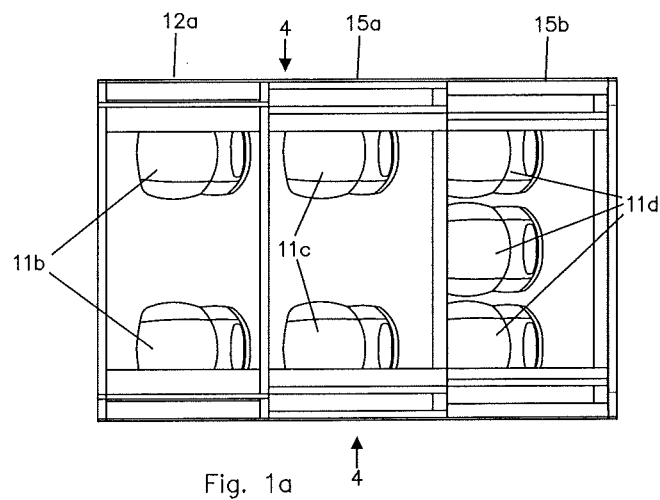
FIG. 1a is a top plan view of the passenger part of the passenger vehicle of FIG. 1.
Figure 1:
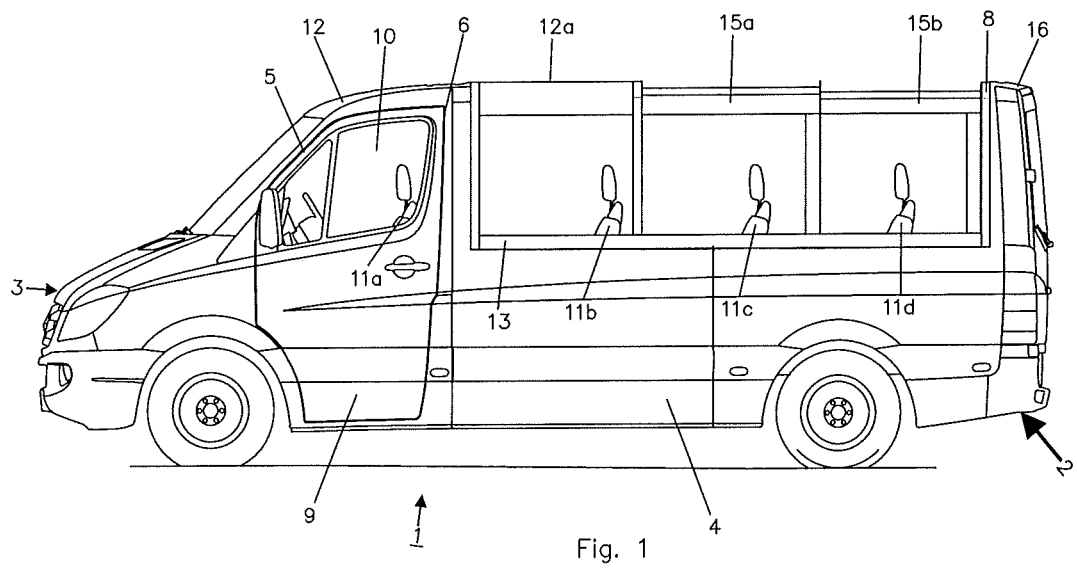
FIG. 1 is a side view of an embodiment of a passenger vehicle according to the present invention in a closed state thereof.

With reference now to FIG. 1, there is shown a passenger bus 1 having a body 2 comprising a front wall, two side walls 4 and a rear wall (not shown in the figures). The body has two A-pillars 5, two B-pillars 6 and two C-pillars 8. Present between the right-hand A-pillar 5 and B-pillar 6 is a door 9 via which passengers can get on and off. Disposed between the A-pillar 5 and the B-pillar 6 on each side is a door 9 provided with a window 10. The passenger bus 1 is provided with rows of seats 11a-d for a driver and passengers. The passenger bus 1 further comprises the usual means known to the skilled person that enable the passenger bus 1 to function, of course. Above the driver's seat 11a, near the window 10, part of a conventional roof 12 extends. The (part of a) conventional roof 12 is provided with a skylight (not shown). The body 2 is further provided with guides 13a. The passenger bus 1 has one immovable roof element 12a of a transparent plastic, and two movable roof elements 15a, 15b, which are made of a frame 14 with transparent plastic. At the rear end of the roof element 12a, seen in the driving direction, the roof element 12a overlaps the roof element 15a over a short distance. Provided between the roof element 12a and the roof element 15a is a seal (not shown in FIGS. 1 and 2), such that the roof element 15a is capable of sliding movement in part of the roof element 12a and that a seal against weather influences, such as precipitation and wind, is provided in the closed position of the roof elements 15a, 15b as shown in FIG. 1. A comparable construction is provided between the roof element 15a and the roof element 15b. At the rear side, the roof element 15b sealingly abuts against the C-pillars 8 and the roof part 16 present therebetween.

FIG. 1a is a top plan view of the passenger part of the passenger bus 1, showing the movable roof elements 15a and 15b in a position in which they cover the passenger seats 11c and 11d. Said position corresponds to the position shown in FIG. 1. The seats are arranged in three rows of two, two and three seats, respectively, seen in the transverse direction of the passenger bus. The seats are also arranged in two rows of tree seats, with a single seat arranged therebetween, in the longitudinal direction. In fact, any arrangement of the seats in a three by three matrix is possible. Also other arrangements are conceivable. If no passenger seat is provided beside the driver's seat, an additional seat may be placed in rows 11b or 11c. The individual seats may be arranged in a position rotated through 90 degrees 180 degrees about a vertical axis.

Figure 2A:
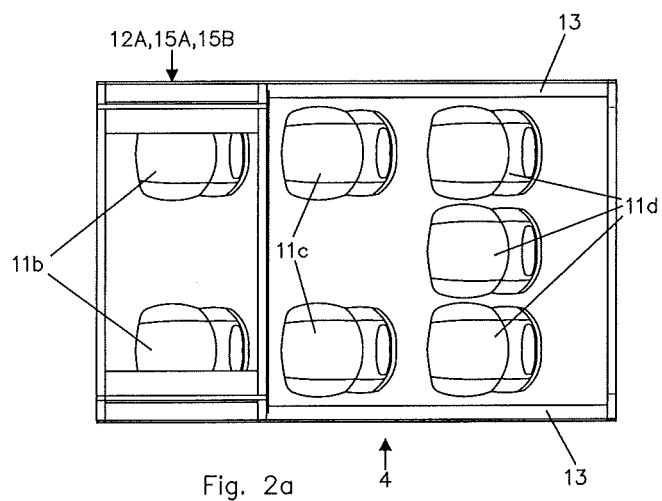
FIG. 2a is a top plan view of the passenger part of the passenger vehicle of FIG. 2.
Figure 2:
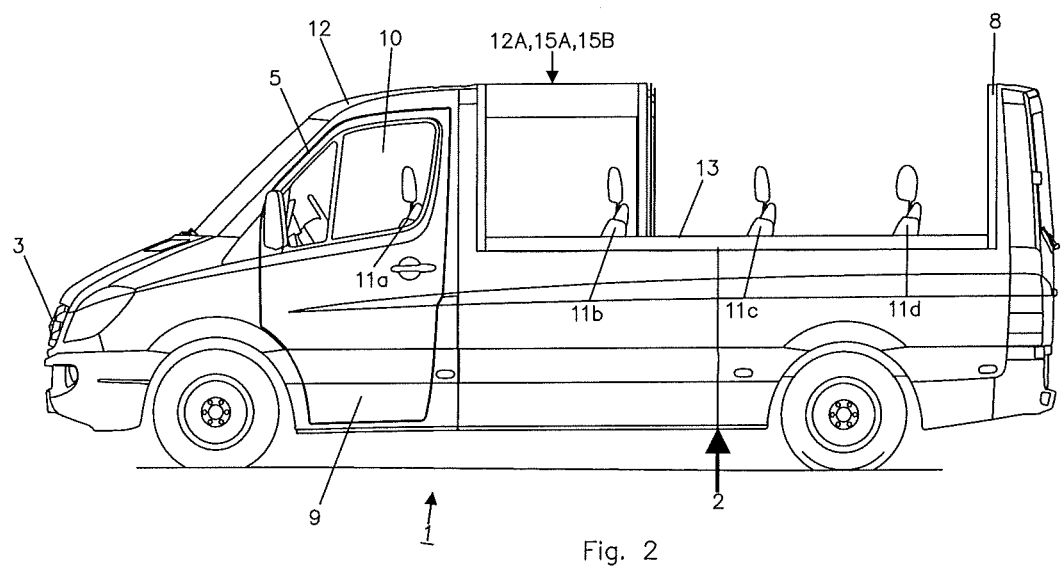
FIG. 2 is a side view of the vehicle of FIG. 1, in this case in an open state thereof.

FIG. 2 shows the passenger bus 1 of FIG. 1. In FIG. 2, corresponding parts of the passenger bus 1 are indicated by the same numerals as in FIG. 1. In FIG. 2, the passenger bus 1 is shown with its roof construction in the open position. The roof element 15b has to that end been moved over the guide rail 13 from its original position (see FIG. 1) to a position under the roof element 15a. Subsequently, the two roof elements 15a, 15b have jointly been moved to a position under part of the element roof 12a. The seat rows 11c and 11d are thus no longer covered. The seat rows 11a and 11b are covered by the roof 12, the roof element 12a and the stored roof elements 15a and 15b. This position of the roof elements 15a and 15b is referred to as a non-covering position or state herein. After all, the seats 11a and 11b and the roof elements 15a and 15b are covered by the roof 12 and the roof element 12a, respectively. Since the roof element 15b is smaller than the roof element 15a, and the roof element 15a is in turn smaller than the roof element 12a, the roof elements 15a and 15b do not experience any hindrance from the wind or the like while driving in the thus stored position shown in FIG. 2.

FIG. 2a shows a top plan view of the passenger part of the passenger bus 1 in the state shown in FIG. 2. As the top plan view shows, five seats 11c, 11d are clear of the cover, and the roof elements 15a, 15a are stored under the roof element 12a.

In the figures and the description the present invention has been shown and described on the basis of a few embodiments thereof. It will be understood, however, that many variants, which may or may not be obvious to the skilled person, are conceivable within the scope as defined in the following claims. The roof elements may also be nestable at the rear of the vehicle or even in the middle of the vehicle rather than in the front of the vehicle. The number of movable roof elements may alternatively be 1, 3, 4 or even more. The roof elements may be entirely or partially made of a material other than a plastic material, for example of glass or another transparent of even non-transparent material. Locking the roof elements can be done in many different ways with or without interaction with any guides. Instead of being guided in separate guides, the roof elements may also be guided in a common guide, etc. The description relates to a minibus, to be sure. It will be understood, however, that also a motor home falls within the scope of the appended claims. For privacy reasons, in contrast to the above description, one or more of the roof elements may be made of a less transparent (or non-transparent) material in that case.

The invention claimed is:

1. A hardtop type minibus provided with a driver's seat and passenger seats, comprising:
   a chassis and a body with a passenger compartment comprising a U-shaped roof construction, the body including spaced A-pillars, B-pillars and C-pillars wherein the passenger compartment is situated between the B-pillars and the C-pi liars, wherein:
   the U-shaped roof construction is positioned between the B-pillars and the C-pillars and covers and extends alongside at least some of the seats of the vehicle and is configured to be retractable over at least some of the seats such that the U-shaped roof construction has an open and closed position, and
   the U-shaped roof construction comprises at least two shape retaining, nestable roof elements which are movable relative to each other and which are configured to be positioned one behind another in the closed position, wherein at least one of the at least two shape retaining roof elements includes a roof portion and two windows.

2. The minibus according to claim 1, wherein the passenger compartment extends from immediately behind the driver's seat to the end of the vehicle in a longitudinal direction of the minibus.

3. The minibus according to claim 1, wherein the length of the passenger compartment is at least 3 meters.

4. The minibus according to claim 1, wherein the minibus includes at least six seats.

5. The minibus according to claim 1, wherein the minibus includes no more than nine seats.

6. The minibus according to claim 1, wherein the minibus includes the driver's seat and at least two rows of passenger seats positioned behind the driver's seat, the two rows of passenger seats being provided in the passenger compartment.

7. The minibus according to claim 1, wherein at least one nestable roof element is transparent over substantially the entire roof construction.

8. The minibus according to claim 1, further comprising at least one nestable roof element that is immovably connected to the body.

9. The minibus according to claim 1, wherein at least one of the at least two shape retaining, nestable roof elements are movable along a guide element.

10. The minibus according to claim 9, wherein the guide element is attached to and extends in a longitudinal direction along the body of the minibus.

11. The minibus according to claim 9, wherein the guide element comprises a rail extending in the longitudinal direction of the minibus.

12. The minibus according to claim 1, wherein the nestable roof elements are arranged to have a graduated, decreasing size such that the nestable roof element in the rear of the minibus is the smallest nestable roof element.

13. The minibus according to claim 1, wherein each of the at least two shape retaining, nestable roof elements is smaller than a preceding one of the at least two shape retaining, nestable roof elements.

* * * * *